Nov. 23, 1954   J. C. HOBBS   2,695,184
TEMPERATURE COMPENSATED FLUID-TIGHT JOINT
Filed May 23, 1950   3 Sheets-Sheet 1
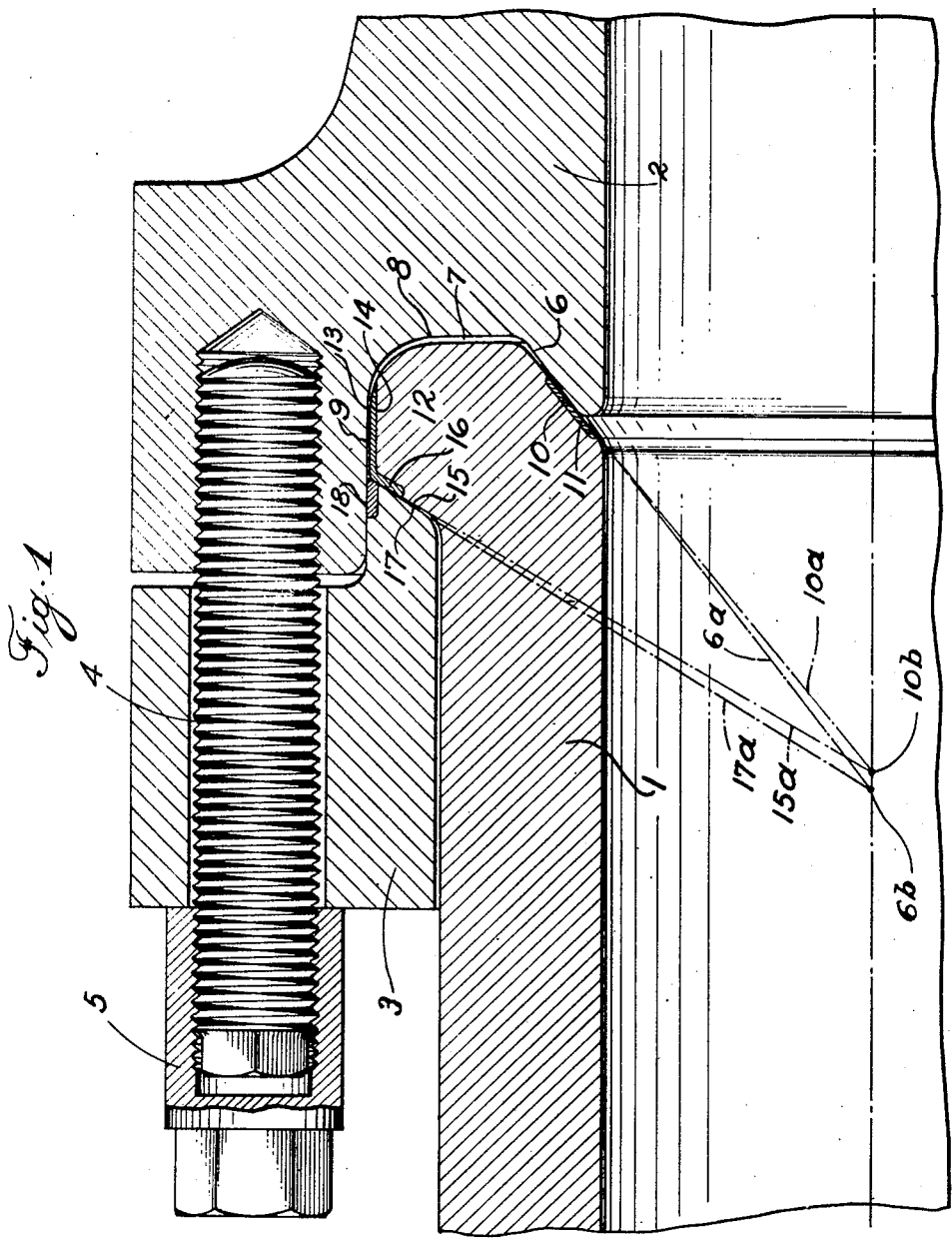
INVENTOR.
JAMES C. HOBBS
BY
Richey & Watts
ATTORNEYS

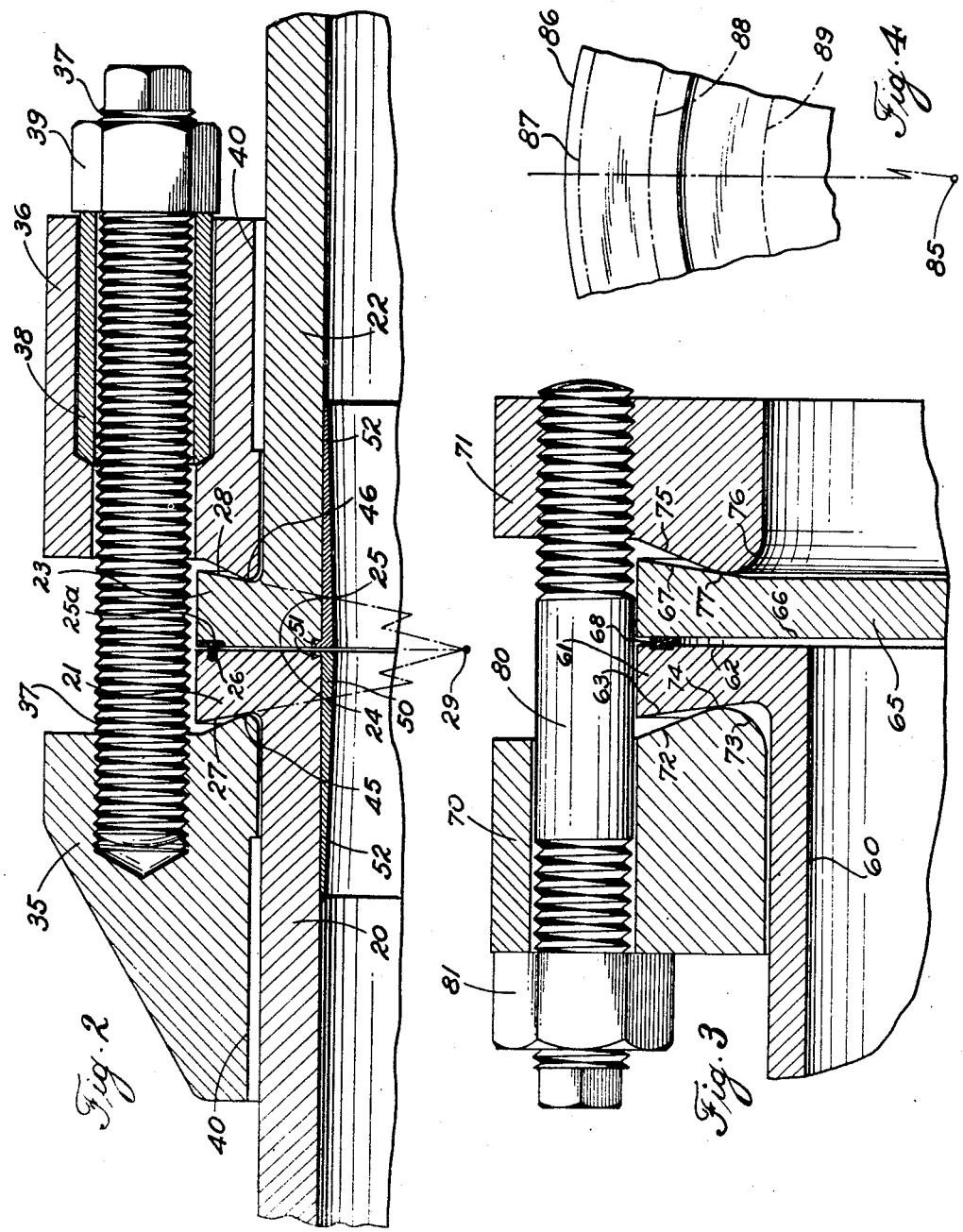

Nov. 23, 1954   J. C. HOBBS   2,695,184
TEMPERATURE COMPENSATED FLUID-TIGHT JOINT
Filed May 23, 1950   3 Sheets-Sheet 3
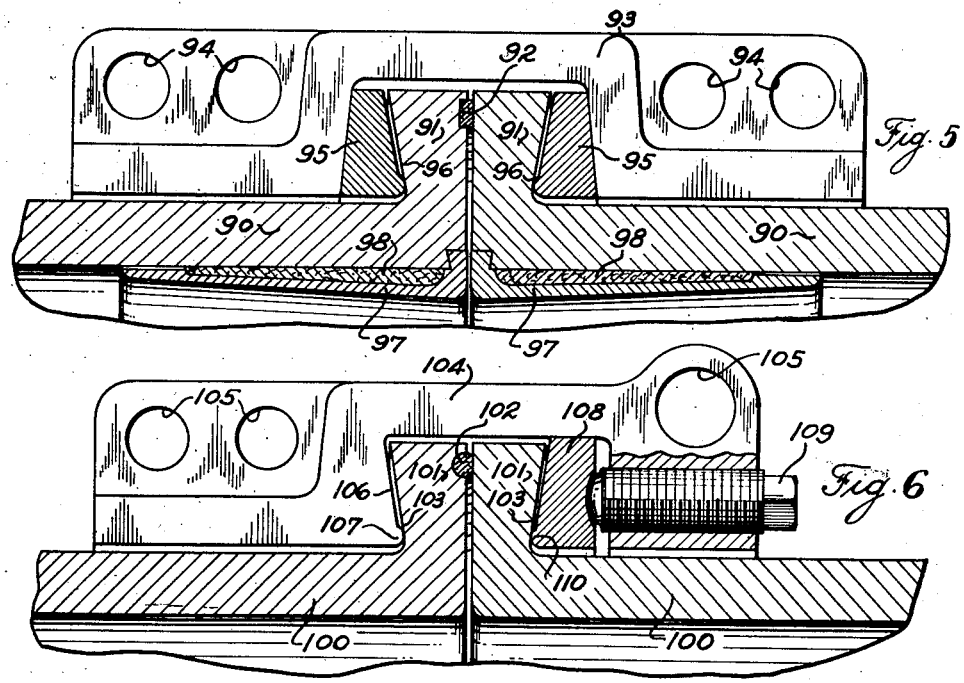
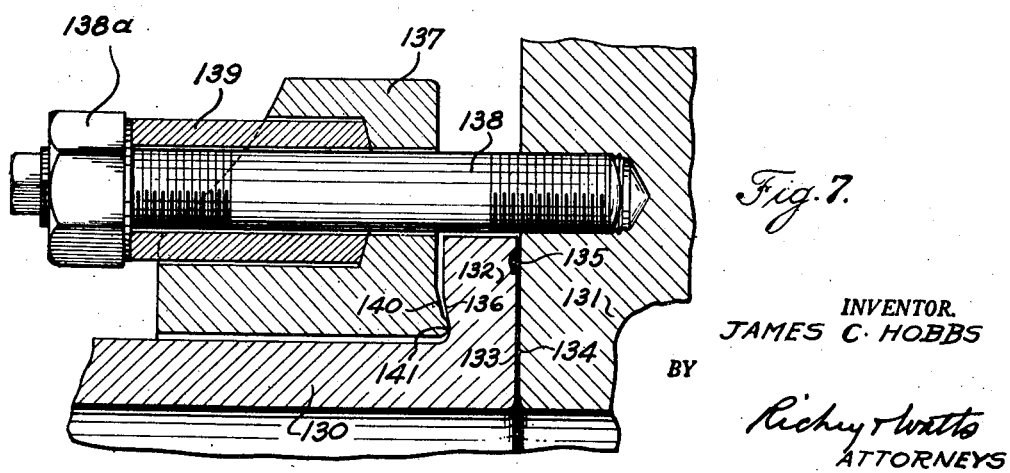
INVENTOR.
JAMES C. HOBBS
BY
Richey & Watts
ATTORNEYS United States Patent Office 2,695,184
Patented Nov. 23, 1954

2,695,184

TEMPERATURE COMPENSATED FLUIDTIGHT JOINT

James C. Hobbs, Coral Gables, Fla.

Application May 23, 1950, Serial No. 163,696

23 Claims. (Cl. 285—129)

This invention relates generally to seals for pressure vessels and is particularly concerned with a new joint for pipes and pressure chambers which will remain fluid-tight in service regardless of the differences in amounts of expansion of the members between which the seal is made.

The problem of controlling fluid at high pressure has long been difficult when the fluid temperature is low and becomes even more difficult as the temperature of the fluid increases. This difficulty is traceable in part to the fact that the forces applied to the metal of the joint are greatly increased as the temperatures increase and may be sufficient to exceed elastic limits of the parts. The danger of permanently deforming the parts of the joint is increased at the higher temperatures where the strength of the metals is lower.

In the case of horizontal conduits carrying fluid at high pressure and high temperature, the bottom part of the conduit is always lower in temperature than the upper part and this difference often amounts to between 50° F. and 150° F. When such fluid is superheated steam and some of it condenses and collects on the bottom of the pipe, the temperature difference may exceed the range just stated. Such differences are reflected in unequal expansion of the conduits which manifests itself disastrously at junctions and seals. For example, where two such horizontal pipes are connected together by bolts in their transverse end flanges, the rigidity of the pipes is so great that the bolts at the bottom of the pipe will be stretched and the joint will leak unless the gasket between the flanges has sufficient local resilience to exceed the local axial shrinkage of the pipe.

Forces applied to the parts of a conventional seal are varied by the relative amounts of expansion of the parts constituting the joint. The difference in amounts of expansion of such parts may be due to a difference in the temperatures of the parts, or to a difference in the coefficients of expansion of the parts. Often both of these causes are present in a given instance and frequently other causes are also present. When there is any difference in the amounts of expansion of the parts constituting the joint, the difficulty of maintaining the joint fluid-tight is greatly magnified as compared with the conditions which would exist in the absence of such differences. This sealing problem is particularly acute where, for example, gases at a temperature of 750° F. or more and at a pressure of 600 or more p. s. i., i. e., pounds per square inch, are present at a joint, for example, between a pipe which consists of a low expansion metal or alloy and another pipe which consists of a high expansion metal or alloy. A rigid connection between two such pipes may cause stress increases of as much as 50,000 p. s. i. in tension and compression when the temperature increases from 100° F. to 1000° F.

Many efforts have been made over a period of many years to provide joints which could be maintained tight against leakage of fluids at high pressures and temperatures, and by high pressures I mean from 650 to 2500 or more p. s. i. and by high temperatures I mean from 750° to 1100° F. or above. However, so far as I know, none of those efforts has solved the problem.

The present invention aims to solve this problem and to that end seeks to provide between two members of a closure, within which there is fluid at high temperature and high pressure, a joint in which the initial sealing forces will remain nearly constant regardless of differences in the amounts of expansion of the members constituting the joint and regardless of the number of heating and cooling cycles of those members.

Broadly stated, these aims are accomplished by a new combination of parts constituting the joint, including a new arrangement of surfaces on some of those parts. The parts or members are so combined that they compensate for changes due to differences in expansion and contraction with attendant maintenance of the sealing action and also improve the sealing action as the fluid pressures increase. The parts or members are provided with surfaces which are so disposed and combined as to serve as "slip" seals, i. e., seals wherein the engaging surfaces may slide on one another during relative expansion and contraction and will maintain substantially the same sealing force at widely different temperatures. To that end the members are provided with opposed annular surfaces between which a fluid seal is formed and at least one of the members is provided with a frusto-conical outer surface. Each of these surfaces is a surface described by rotation of a straight generatrix line about one end thereof disposed at substantially the same point on the centerline of one of the members, with the generatrix line of the outer frusto-conical surface being inclined at an acute angle to the generatrix line of the opposed surfaces. The generatrix lines of the two opposed surfaces may be substantially coincident and, if desired, each of the members comprising the joint may be provided with an outer frusto-conical surface of the type just described.

The generatrix lines of the opposed surfaces may make angles ranging from substantially right angles to small acute angles of 20° or less with the centerline on which their ends are positioned. The generatrix line of the outer frusto-conical surface may likewise make various angles with the same centerline but in each instance the angle is larger than that of the other lines. For example, when the lines of the opposed surfaces make angles of substantially 90° with the centerline of one of the members carrying those surfaces the line of the outer frusto-conical surface should make an angle of over 90° with the same line and when the lines of the opposed surfaces make an angle of 30° with the centerline, the line of the outer frusto-conical surface may make an angle of as much as 60°. When the said surfaces are formed on flanges which project outwardly and transversely beyond the side of the body of pipe, the sealing line or zone may be located outside of the line or zone of the bolting or place of application of securing force.

As a result of the above described form and arrangement of parts and surfaces the sealing action is maintained substantially constant without a corresponding increase in tension on the bolts or other securing means and without exceeding the elastic limit of any of the joint elements, and the joint stays tight throughout repeated heating and cooling cycles and regardless of wide differences in expansion or contraction of the joint elements.

The present invention will be better understood by those skilled in the art from the following specification and the accompanying drawings of apparatus embodying the present invention, in which:

Fig. 1 is a longitudinal, central, sectional view of one form of pipe joint;

Fig. 2 is a similar section of a modified form of pipe joint;

Fig. 3 is a fragmentary, longitudinal, sectional view of a closure joint;

Fig. 4 is a diagrammatic view showing the location of forces in the joint of Fig. 3; and Figs. 5, 6, and 7 are longitudinal, sectional views through modified forms of holding means for joints of this invention, Fig. 7 illustrating holding means for a joint between a fixed apparatus, for example, steam turbine and a pipe and the other figures illustrating holding means for pipe joints.

The embodiment of the present invention which is illustrated in Fig. 1 comprises two aligned pipes 1 and 2 which are held in assembled position by securing means including ring 3, bolt 4 and nut 5. It will be understood that there are a plurality of bolts and nuts 4 and 5 spaced circumferentially apart about pipe 1.

Pipe 2 has a surface 6 which coincides with one which would be generated by rotation of generatrix line 6a about one end thereof located at approximately point 6b on the centerline of the pipes. It has an annular recess 7 around surface 6 which is defined by transverse wall 8 and a longitudinally extending circumferential wall 9. This recess is dimensioned to receive the adjacent end of pipe 1.

Pipe 1 has a surface 10 which is opposed to surface 6 of pipe 2 and which coincides with a surface which would be generated by rotation of generatrix line 10a about one end thereof positioned on the centerline of the pipes at 10b closely adjacent to point 6b. It is preferable that the centers of rotation 6b and 10b of generatrix lines 6a and 10a should not exactly coincide to the end that the opposed, engaging surfaces 6 and 10 will have a narrow, substantially line contact with each other. Surface 10 may be provided with an insert 11 of hard or wear-resistant metal where the surface engages the opposed surface 6 of pipe 2. If desired, a similar wear-resistant metal insert (not shown) may be provided in surface 6 but for most purposes only one of these surfaces need be provided with a wear-resistant insert and because of ease of installation it is preferable to provide such an insert on surface 10 of pipe 1.

The end of pipe 1 is enlarged radialy, i. e., it extends beyond the outer surface of the body of the pipe and nearly fills the recess 7. At its outer periphery this enlargement 12 is provided with a substantially cylindrical surface 13 which preferably has a wear-resistant metal insert 14 opposed to cylindrical surface 9 of pipe 2. The enlargement 12 has a frusto-conical outer surface 15 which coincides with one which would have been generated by rotation of generatrix line 15a about one end thereof positioned on the centerlines of the pipes substantially coincident with point 10b. This surface 15 is also preferably provided with a wear-resistant insert 16 where it is to be engaged by the opposed edge of ring 3.

Ring 3 surrounds pipe 1 but its inside diameter is larger than the outside diameter of the pipe 1 so as to provide a space which will act as an impedance or barrier to transfer of heat from pipe 1 to the ring. Ring 3 is urged toward pipe 2 by screwing nuts 5 down on bolts 4 which are screw-threaded into pipe 2. Its edge 17, which is opposed to and engages with surface 15 of enlargement 12, coincides with a surface which would have been generated by rotating generatrix line 17a about one end thereof located on the centerlines of the pipes substantially at point 6b. By reason of the slight angle between generatrix lines 15a and 17a, surfaces 15 and 17 will engage in a narrow, circumferential contact line. Preferably surface 17 is provided with a wear-resistant metal insert 18 to engage with insert 16 of the pipe end 12. Insert 18 may be made removable if desired.

As indicated in Fig. 1, the angle included between surfaces 6 and 10 is about 2° and a similar angle is included between surfaces 15 and 17. Thus each of these pairs of surfaces make narrow, circumferential line contacts with each other and forces applied by the ring securing means, such as bolts 4 and nuts 5, will press these pairs of surfaces against each other with high unit pressure and, hence, will afford good initial seals.

The mode of operation and results of the apparatus of Fig. 1 will be understood from the following description:

Let it be assumed that the parts are assembled as shown in Fig. 1 with sufficient force being applied by bolts and nuts 4 and 5 to afford good initial sealing between surfaces 6 and 10 and surfaces 15 and 17 and insert 18 has been expanded by angular contact with surface 15 and makes a good seal with surface 9. If now a high temperature, high pressure fluid, for example, steam at 900° F. and 1500 p. s. i., is admitted into the interior of these pipes, it will progressively heat them from the interior surfaces outwardly and will expand these pipes both axially and radially. Since the end of pipe 1 is surrounded by the bolt carrying portion of pipe 2 and by ring 3 and since the complementary end of pipe 2 is larger and will heat up more slowly because of its bulk and its larger surfaces exposed to the air, the dimensions of pipe 1 will increase at a faster rate than those of pipe 2. As the enlarged end portion of pipe 1 expands the direction of expansion of each portion thereof is along radial lines from point 10b because pipe 2 and ring 3 contact and position the enlarged end 12 of pipe 1 on the frusto-conical surfaces 10 and 15. The temperature of the various parts shown in Fig. 1 will gradually tend to become substantially equal and as this condition is approached the lines of contact between surfaces 6 and 10 and between surfaces 15 and 17 will approach their original locations. This shifting of lines of contact between the positions they assume when the parts are at different temperatures to the positions they occupy when the parts are at substantially the same temperature will take place without any pronounced change in the initial forces applied to the parts.

As these lines of contact shift, as just described, with changes and differences in temperature, the opposed surfaces act like sliding or slip joints. That is, surfaces 6 and 10 slide or slip relatively on one another and the same thing is true of surfaces 15 and 17. This slipping or sliding action accommodates quite considerable differences in amounts of expansion of these several parts and of the securing means without any considerable change in the initial forces of the parts against one another and without the creation of stresses in the parts which could exceed the elastic limits of those parts.

It will also be understood that the apparatus just described can accommodate in the same manner the large differences in amounts of expansion of the parts which would be present in a joint where the parts 1 and 2 were made of metals having widely different coefficients of expansion, where the pipes are of different thicknesses, where the pipes are composed of metals having different coefficients of thermal conductivity or where one pipe is afforded much better cooling action by the atmosphere than was the other pipe.

It will also be obvious that when part 1 is made of a metal having a higher coefficient of expansion than part 2 that surface 13 will approach surface 9 as the temperature is increased and if, as desired, the initial clearance or space between said surfaces is less than the normal differential expansion between parts 1 and 2, the surface 13 of part 1 will expand into sealing contact with surface 9 of part 2 thereby forming a third sealing line in series with the two previously described lines so that all must be defective in performance at the same time to permit any leakage through the joint.

The device shown in Fig. 2 comprises a pipe 20 having an end flange 21 and another pipe 22 having an end flange 23. The opposed end surfaces 24 and 25 of flanges 21 and 23, respectively, are substantially parallel but are spaced slightly apart from the inner edges thereof to a point near their outer peripheries where a seal ring 26 preferably carried in a recess in surface 24 initially engages the opposed end surface 25 or an insert 25a in surface 25. The flanges are thinnest near the outer surfaces of the pipes and have outer remote surfaces 27 and 28 which diverge outwardly and are frusto-conical. Surfaces 24 and 25, and 27 and 28 are surfaces which would coincide with surfaces generated by straight generatrix lines rotaing about one of their ends located substantially at the point 29 on the longitudinal centerline of the pipes. The generatrix lines of surfaces 24 and 25 are substantially coincident, i. e., they may define therebetween a minute angle. The generatrix lines of surfaces 27 and 28 are inclined at acute angles to the generatrix lines of surfaces 24 and 25 and preferably, though not necessarily, these lines of surfaces 27 and 28 make the same included angle with those lines of surfaces 24 and 25.

The pipes 20 and 22 are held in assembled position and surfaces 24 and 25 are pressed against seal ring 26 in fluid sealing contact by means which include the two rings 35 and 36 which surround pipes 20 and 22, respectively, bolts 37 attached to ring 35, sleeve washers 38 located in countersunk sockets in ring 36, and nuts 39 on bolts 37 and bearing against the outer ends of washers 38. Each of these washers 38 has about the same cross-sectional area of the bolt it surrounds and the material has about the same modulus of elasticity as the bolt material. When the bolt 37 is loaded by screwing down the nut 39, the washer 38 will compress about the same amount per inch of length as the corresponding length of the bolt elongates. Thus the equivalent spring length of the bolt assembly is increased. This longer spring length permits the slight relative expansion of the parts to take place with less change in bolt loading than would otherwise occur. In this manner it is possible to keep the stresses above those required to maintain the fluid seal at the joint and less than the elastic limit of the parts.

The rings 35 and 36 are slightly larger in inside diameter adjacent to flanges 21 and 23 than the outside diameter of pipes 20 and 22 and are considerably larger in inside diameter remote from flanges 21 and 23 and thus provide annular spaces, indicated generally at 40, in which heat insulating material (not shown) may be placed if desired. Ring 35 has a frusto-conical end surface opposed to the surface 27 and preferably these two surfaces engage on a narrow annular area some little distance away from the outer surface of the pipe 20, for example, as indicated at 45 and, also preferably, these surfaces diverge outwardly at a small included angle of, for example, 1° or 2°. Similarly, ring 36 is provided with a frusto-conical end surface opposed to the surface 28 and makes a narrow annular area of contact with that surface some little distance away from the outer surface of pipe 22, for example, as indicated at 46, and these two surfaces preferably diverge outwardly at a small angle, for example, 1° or 2°.

Thermal sleeves 50 are preferably placed within the adjacent ends of pipes 20 and 22. Each of these sleeves includes a flange 51 to seat in an annular recess in the end of its pipe, an axially extending tubular portion 52 having an outer surface which lies in substantial engagement with the inner surface of the pipe, and an inner surface which is inclined at a small angle to the outer surface. Thus each sleeve has a wall which gradually tapers from its greatest thickness at the flange 51 to its least thickness at its end remote from flange 51. These thermal sleeves are initially heated rapidly by the fluid within the pipe and dissipate their heat more slowly to the surrounding ends of their pipes. This slow transfer of heat to the pipes is closer to the rate of dissipation of heat from the pipe and, hence, the difference in the rate of expansion and contraction of the pipe and the securing means located therearound is less pronounced than when the thermal sleeves are omitted.

In use, the apparatus of Fig. 2 operates substantially as follows:

Let it be assumed that the nuts 39 are turned on bolts 37 so that the rings 35 and 36 will press against flanges 21 and 23 and will press seal ring 26 and insert 25a into fluid sealing contact with each other on a narrow annular line. When high pressure, high temperature fluid is brought into the interior of pipes 20 and 22, these pipes will increase in temperature with resultant axial and radial expansion and this expansion will be greatest in the portions surrounded by rings 35 and 36 and thereby shielded against rapid heat dissipation to the air. As the pipes expand radially the annular contacts 45 and 46 of rings 35 and 36 on flanges 21 and 23 will shift inwardly along surfaces 27 and 28 because of the diffeence in outward movement of the flanges and the rings. The contact lines 45 and 46 remain a constant distance apart so long as the temperature of the rings 35 and 36 and the bolting 37—38—39 remain at constant temperature and therefore retain their constant dimensions.

The flanges 27 and 28 expand in all dimensions with increase in temperature but the thickness of the flanges at a constant radius, say 45 or 46, remains constant because surfaces 24—25 and 27—28 are frusto-conical, having the common apex point 29. After the pipes have been heated for some time and rings 35 and 36 have attained approximately the temperature of pipes 20 and 22, the parts tend to resume the contact positions they occupied when they were initially assembled. All parts are relatively larger when hot and smaller when cold but with this conical construction the relation of the sealing surfaces and forces is constant.

As in the case of the apparatus of Fig. 1, the insert 25a may be made of hard, wear-resistant metal, such as Stellite or other suitable material.

Fig. 3 illustrates apparatus quite like that shown in Fig. 2, the main difference being that one pipe has been replaced by an end closure and the other may be a pipe or a vessel. In this figure, member 60, which may be a vessel, is provided with an end flange 61 which has a surface 62 corresponding to surface 24 of Fig. 2 and a frusto-conical outer surface 63 corresponding to surface 27 of Fig. 2. The pipe 22 of Fig. 2 has been replaced by closure 65 which extends across the end of member 60 and is substantially coextensive with the flange 61 of pipe 60. This closure 65 has a surface 66 corresponding to surface 25 of Fig. 2 and opposed to surface 62 of flange 61. The closure also has an outer frusto-conical surface 67 corresponding to surface 28 of Fig. 2. Between the opposed surfaces 62 and 66 and near the outer periphery thereof, a gasket or seal ring 68 is positioned to seal the space between these surfaces against the escape of fluid under pressure. Surfaces 62 and 66 coincide with surfaces which have been generated by rotation of generatrix lines around one end thereof positioned on the centerline of the pipe or vessel 60 at approximately the same point. These two generatrix lines do not actually coincide but lie close together so that there is only a small space provided between surfaces 62 and 66. Surfaces 63 and 67 coincide with surfaces which have been generated by rotation of generatrix lines about, and located at substantially the same point as indicated on the centerline of the pipe or vessel 60. The surfaces 62 and 66 correspond closely with surfaces 24 and 25 of Fig. 2 and frusto-conical surfaces 63 and 67 correspond closely with surfaces 27 and 28 of Fig. 2.

Rings 70 and 71 which are generally similar in shape and function to rings 35 and 36 of Fig. 2 are provided to create an initial sealing force between surfaces 62 and 66 and gasket 68 and to retain the parts in assembled position at all times. Ring 70 surrounds member 60 with a radial clearance space therebetween which may be small or large, as desired, and may contain heat insulating material after the fashion shown at 40 in Fig. 2. The surface 72 of ring 70 which is opposed to frusto-conical surface 63 of flange 61 is conical or frusto-conical, is inclined at a small angle to surface 63 and is cut away near its inner edge, as at 73, so as to provide an annular, line contact 74 with surface 63. Ring 71 is provided with a similar frusto-conical surface 75, a cut-away surface 76 and has an annular line contact with frusto-conical surface 67 as indicated at 77.

The rings 70 and 71 may be adjusted and held in assembled position by any suitable means but the means shown includes a plurality of bolts 80 threaded into ring 71, passing through ring 70 and carrying nuts 81 to bear against the outer surface of ring 70. If desired, other securing means may be used such as the bolt and socket construction of Fig. 2 or the securing means of Figs. 5 to 8, presently to be described. When rings 70 and 71 are pressed against surfaces 63 and 67 to make the annular line contacts 74 and 77, the surfaces 62 and 66 are pressed against gasket 68 and sufficient force is so applied to provide the initial sealing action, i. e., when the parts are cold and the fluid within the apparatus is at room temperature and atmospheric pressure.

When members 60 and 65 are heated prior to the heating and expansion of support structure 70—71—80—81, the frusto-conical surfaces 63 and 67 remain in constant contact with the supports 70 and 71 at lines 74 and 77 without any substantial change in loading forces at said positions of support.

When the support structure is heated and expands the distance between the contacts 74 and 77 increases proportionately to the radial expansion because of the conical shape of the surfaces 63 and 67 having their apices at the same point 85.

Pressure vessels must, of necessity, be subject to wide changes in pressure at least during the starting and stopping operations. Conventional flanges on pressure vessels or pipes, when subjected to any internal fluid pressures, deflect in such a manner that the joints tend to leak more as the pressure increases.

These new joints utilize those deflections to increase the gasket pressure and reduce the tendency to leak.

In action the joint shown in Fig. 3 is held together with bolts 80, nuts 81 acting through flanges 70 and 71 against fulcrum points 74 and 77. The internal pressure moves the member 60 away from the central portion of closure 65 but the fulcrum points 74 and 77 are restrained by the greater rigidity of bolt 80, nut 81 and rings 70 and 71. This causes the flange 61 and the outer rim of closure 65 to deflect and move against the gasket 68 with greater force as the pressure increases, thus making the joint tighter.

The same beneficial deflection and fulcrum action is present and obvious in the other joints shown.

In Fig. 4 is shown diagrammatically a sector-like part of the closure 65. This sector extends from the centerline 85 of the closure to the periphery 86 thereof. Line 87 is a fragment of the annulus on which the gasket 68 is located and may be termed the "sealing" circle. Line 88 is a fragment of an annulus indicating the line contact 77 and may be designated as the "support" circle. Line 89 indicates a fragment of an annulus which may be called the "pressure" circle and which is located at a distance from the center 85 which is equal to two-thirds of the radial distance from that center of the member 60 to the "sealing" circle. Since the "support" circle 88 is located between the "sealing" circle 87 and the "pressure" circle 89, the total load inside the "support" circle will be greater than the total load outside of that "support" circle and, as a result, the flange 61 and the corresponding part of closure 65 will tend to fulcrum about the "support" circles 74 and 77 as the pressures increase and decrease while the sealing force being applied to gasket 68 will increase with fluid pressures within pipe 60.

In Fig. 5 is shown a modified form of joint securing means. The pipes 90 have their flanges 91 held with initial sealing pressure against gasket 92 by an axially split ring 93 which may consist of two or more parts secured together by bolts in holes 94 thereof. This ring forces rings 95 to engage inwardly converging frusto-conical surfaces 96 of the flanges on substantially annular line contacts. The pipes 90 are provided with flanges and with thermal sleeves 97 which are quite similar to the sleeves 50 of Fig. 2 but which are recessed on their outer surfaces to provide space for heat insulating material 98.

In Fig. 6 the pipes 100 have flanges 101, the opposite surfaces of which engage a gasket 102. The flanges have outer frusto-conical surfaces 103 similar to surfaces 27 and 28 of Fig. 2. These joint parts are held in assembled position by a ring 104 which is axially split at two or more places and the parts of which are held together by bolts in holes 105. One annular surface 106 of ring 104 is frusto-conical and is substantially parallel to surface 103 of the adjacent flange 101 but is provided with an annular rib 107 which forms a line contact with surface 103. A ring 108 is disposed against the outer surface of the other flange 101 and is pressed against the surface 103 thereof by screws 109. This ring 108 has a surface generally parallel to the adjacent surface 103 and has an annular rib 110 quite like rib 107 and forming a line contact with the opposed frusto-conical surface 103.

In Fig. 7 is shown a joint between a pipe end 130 and a fixed piece of apparatus 131 which may, for example, be a steam turbine. The flange 132 of the pipe has a surface 133 which is opposed to, and substantially parallel with, surface 134 of apparatus 131 and a gasket 135 is disposed between these parts near the outer periphery of the flange 132. The outside surface 136 of flange 132 is frusto-conical after the general fashion shown in Figs. 2, 3, 5 and 6. Joint securing means includes ring 137. A plurality of bolts 138 extending therethrough are screw-threaded into apparatus 131, sleeve washers 139 seated in recesses in ring 137 and engaged at their outer ends by nuts 138a on bolts 138. This construction is quite similar to that shown in Fig. 2. At its end opposed to flange 132, ring 137 is provided with a frusto-conical surface 140 to lie out of contact with surface 136 and a projecting rib 141 which makes a line contact with surface 136.

It will be understood that the joint securing means may be chosen from the various modifications herein illustrated or non-inventive variations thereof, the essential factor being that the securing means should provide annular contacts, which are quite narrow in radial extent, between the opposed surfaces or between the securing means and the surfaces of the flange or flange-like parts between which the gaskets are located and that when these line contacts are on flanges, the contacts should lie at a distance from the centerline of the joint which is less than the center of sealing circle and greater than two-thirds of the radius of that circle.

The foregoing description has been made rather full and includes many details so that those skilled in the art may be thoroughly acquainted with the invention herein which is outstandingly novel and important in the handling of high pressure, high temperature fluids. The more important features of that disclosure include the use of opposed surfaces between two parts which are to be sealed and an outer conical surface, with these three surfaces being such as would have been generated by the rotation of straight generatrix lines about their ends thereof disposed on the longitudinal centerline of one of the members at substantially the same point. When such a condition is present the joint will be maintained throughout wide temperature ranges with wide differences in temperatures of the parts or portions of the parts and without increasing the initial sealing forces to such an extent as to exceed the elastic limit of any of the parts. When the joint embodying this invention involves the surface of a transversely extending flange and the "support" circle is disposed between the "sealing" circle and the "pressure" circle, there is realized in addition to the foregoing advantages, the further advantage of the fulcrum-like action utilizing the internal fluid pressure as above described.

Conventional flanged joints have heretofore failed to operate satisfactorily in high pressure, high temperature service due largely to the presence of thick flanges and long bolts. Since the flanges heat faster than the bolts, the relative expansion of the flanges is much greater than that of the bolts and, as a result, the bolts are stretched beyond their elastic limit and are permanently elongated, before they attain the temperature of the flanges. Under those conditions the joints tend to leak when the temperature of the bolts approximates or exceeds the temperature of the flanges.

The present invention avoids joint leakage due to such unequal expansions by reducing the differences in expansion to an amount insufficient to cause such permanent deformation of the bolts, or partly by reducing the difference in expansion and partly by, in effect, increasing the elastic range of the bolts.

When the effective place of attachment of the bolts to the flanges, i. e., the place at which the bolts transfer their load to the flanges, is in the plane passing through the sealing ring or the engagement of the sealing surfaces, the bolts will not be permanently deformed and the joint will be kept tight through repeated heating and cooling cycles. When the said effective place is disposed at a substantial distance from said plane and the effective elastic range for the bolts in increased correspondingly, substantially the same result is attained.

Fig. 1 illustrates the first of the foregoing conditions since the effective place of attachment of bolt 4 to the flange of pipe 2 is radially outside of the engagement of sealing surfaces 15 and 17, i. e., in a plane passing through those surfaces. In this case there will be substantially no difference in axial expansion of the parts of the securing means and the bolts will not be stressed beyond their elastic limit. Fig. 2 illustrates the second above mentioned condition. There the effective places of attachment of the bolts to the flanges are a short distance from either side of the transverse plane passing through the seal ring 26. Differences in axial expansion traceable to this axial spacing of said places of attachment and the said plane are compensated for by using sleeve washers 38 which have the effect of increasing the elastic range of the bolts. As will be understood, the effect of using these sleeves 38 is to position the point of load transfer from the bolts to the flange at about the left-hand end of the sleeves and yet the sleeves act effectively to extend the length of each bolt an an amount equivalent to the length of its sleeve. Thus, any given increase in the distance between contact lines 45 and 46 of Fig. 2 will be distributed over a length equivalent to the combined lengths of the bolt and its sleeve, and hence, such increase can be tolerated without permanently elongating the bolts.

Having thus described the present invention so that others skilled in the art may be able to understand and practice the same, I state that what I desire to secure by Letters Patent is defined in what is claimed.

What is claimed is:

1. A fluid-tight joint comprising a metal member having an annular contact surface, a second metal member having outer and inner frusto-conical surfaces, said annular surface being engageable with said inner surface between the inner and outer boundaries of the latter, said outer and inner surfaces each being generatable by rotation of its straight generatrix line about one end thereof positioned at approximately the same point on the center line of said second member, there being a space outwardly of the frusto-conical surfaces sufficient to permit relative expansion of said second member without permanent deformation and metal means operatively associated with said members, and engaging said outer surface between its inner and outer boundaries for urging said inner and annular surfaces into sealing contact with each other.

2. A fluid-tight joint comprising a metal member having an annular frusto-conical contact surface, a second metal member having outer and inner frusto-conical surfaces, said annular surface being engageable with said inner surface between the inner and outer boundaries of the latter, said outer and inner surfaces each being generatable by rotation of its straight generatrix line about one end thereof positioned at approximately the same point on the center line of said second member, there being a space outwardly of the frusto-conical surfaces sufficient to permit relative expansion of said second member without permanent deformation and metal means operatively associated with said members, and engaging said outer surface between its inner and outer boundaries for urging said inner and annular surfaces into sealing contact with each other.

3. A fluid-tight joint comprising a metal member having an annular frusto-conical contact surface, a second metal member having outer and inner frusto-conical surfaces, said annular surface making a small included angle with and being engageable with said inner surface between the inner and outer boundaries of the latter, said outer and inner surfaces each being generatable by rotation of its straight generatrix line about one end thereof positioned at approximately the same point on the center line of said second member, there being a space outwardly of the frusto-conical surfaces sufficient to permit relative expansion of said second member without permanent deformation, and metal means operatively associated with said members and engaging said outer surface between its inner and outer boundaries for urging said inner and annular surfaces into sealing contact with each other.

4. A fluid-tight joint comprising a metal member having an annular frusto-conical contact surface, a second metal member having outer and inner frusto-conical surfaces, said annular surface being engageable with said inner surface between the inner and outer boundaries of the latter, said outer and inner surfaces each being generatable by rotation of its straight generatrix line about one end thereof positioned at approximately the same point on the center line of said second member, there being a space outwardly of the frusto-conical surfaces sufficient to permit relative expansion of said second member without permanent deformation, metal means operatively associated with said members and engaging said outer surface between its inner and outer boundaries for urging said inner and annular surfaces into sealing contact with each other, and bolts extending substantially parallel to the longitudinal centerline of said members for securing said members and metal means in assembled position.

5. A fluid-tight joint comprising a metal member having an annular contact surface, a second metal member having outer and inner frusto-conical surfaces, said annular surface being engageable with said inner surface on a sealing circle between the inner and outer boundaries of the latter, said outer and inner surfaces each being generatable by rotation of its straight generatrix line about one end thereof positioned at approximately the same point on the center line of said second member, there being a space outwardly of the frusto-conical surfaces sufficient to permit relative expansion of said second member without permanent deformation, metal means operatively associated with said members and engaging said outer surface between its inner and outer boundaries for urging said inner and annular surfaces into sealing contact with each other, and means for securing said metal means and said members in assembled position, the effective plane of attachment of said securing means lying close to the plane of said sealing circle.

6. A fluid-tight joint comprising a member having an annular contact surface within a recess having a substantially cylindrical wall, a second member having outer and inner frusto-conical surfaces, said annular surface being engageable with said inner surface between the inner and outer boundaries of the latter, said outer and inner surfaces each being generatable by rotation of its straight generatrix line about one end thereof positioned at approximately the same point on the center line of said second member, said members when assembled providing a space therebetween and outwardly of said frusto-conical surfaces large enough to accommodate relative expansion of said second member without permanent deformation, a ring member engaging said wall of said recess and said outer surface between its inner and outer boundaries, and metal means operatively associated with one of said members and engaging said ring member for urging it into sealing contact with said members.

7. A fluid-tight joint comprising a member having an annular contact surface within a recess having a substantially cylindrical wall, a second member having outer and inner frusto-conical surfaces, said annular surface being engageable with said inner surface between the inner and outer boundaries of the latter, said outer and inner surfaces each being generatable by rotation of its straight generatrix line about one end thereof positioned at approximately the same point on the center line of said second member, said members when assembled providing a space therebetween and outwardly of said frusto-conical surfaces large enough to accommodate relative expansion of said second member without permanent deformation, a ring member engaging said wall of said recess and said outer surface between its inner and outer boundaries with sealing contact, and metal means operatively associated with one of said members and engaging said ring member for urging said inner and annular surfaces into sealing contact with each other.

8. A fluid-tight joint comprising a member having an annular contact surface within a recess having a substantially cylindrical wall, a second member having a substantially cylindrical outer surface opposed to said cylindrical wall and having outer and inner frusto-conical surfaces, said annular surface being engageable with said inner surface between the inner frusto-conical and outer boundaries of the latter, said outer and inner frusto-conical surfaces each being generatable by rotation of its straight generatrix line about one end thereof positioned at approximately the same point on the center line of said second member, said members when assembled providing a space between said cylindrical surfaces small enough for said surfaces to engage with sealing contact under relative expansion without permanent deformation, a ring member engaging said cylindrical wall of said recess and said outer frusto-conical surface between its inner and outer boundaries with sealing contact, and metal means operatively associated with one of said members and engaging said ring member for maintaining said members in position when their cylindrical surfaces are in sealing contact.

9. A fluid-tight joint comprising a member having an annular contact surface within a recess having a substantially cylindrical wall, a second member having a substantially cylindrical outer surface opposed to said cylindrical wall and having outer and inner frusto-conical surfaces, said annular surface being engageable with said inner surface between the inner and outer boundaries of the latter, said outer and inner frusto-conical surfaces each being generatable by rotation of its straight generatrix line about one end thereof positioned at approximately the same point on the center line of said second member, said members when assembled providing a space between said cylindrical surfaces small enough for said surfaces to engage with sealing contact under relative expansion without permanent deformation, a ring member engaging said cylindrical wall of said recess and said outer frusto-conical surface between its inner and outer boundaries with sealing contact, and metal means operatively associated with one of said members and engaging said ring member for urging said inner and annular surfaces into sealing contact with each other.

10. A fluid-tight joint comprising a member having an annular contact surface within a recess having a substantially cylindrical wall, a second member having outer and inner frusto-conical surfaces, said annular surface being engageable with said inner surface between the inner and outer boundaries of the latter, said outer and inner surfaces each being generatable by rotation of its straight generatrix line about one end thereof positioned at approximately the same point on the center line of said second member, said members when assembled providing a space therebetween and outwardly of said frusto-conical surfaces large enough to accommodate relative expansion of said second member without permanent deformation, a continuous ring member engaging said wall of said recess and said outer surface between its inner and outer boundaries, and metal means operatively associated with said ring and extending substantially parallel to the longitudinal center line of said members for securing said ring and members in assembled sealing position.

11. A fluid-tight joint comprising a member having an annular contact surface within a recess, a second member having outer and inner frusto-conical surfaces, said annular surface being engageable with said inner surface between the inner and outer boundaries of the latter, said outer and inner surfaces each being generatable by rotation of its straight generatrix line about one end thereof positioned at approximately the same point on the center line of said second member, said members when assembled providing a space therebetween and outwardly of said frusto-conical surfaces large enough to accommodate relative expansion of said second member without permanent deformation, a ring member engaging said outer surface between its inner and outer boundaries, and metal means operatively associated with one of said members and engaging said ring member for urging said inner and annular surfaces into sealing contact with each other.

12. A fluid-tight joint comprising a member having an annular contact surface within a recess having a substantially cylindrical wall, a second member having a substantially cylindrical outer surface opposed to said cylindrical wall and having outer and inner frusto-conical surfaces, said annular surface being engageable with said inner surface between the inner and outer boundaries of the latter, said outer and inner frusto-conical surfaces each being generatable by rotation of its straight generatrix line about one end thereof positioned at approximately the same point on the center line of said second member, said members when assembled providing a space between said cylindrical surfaces small enough for said surfaces to engage with sealing contact under relative expansion without permanent deformation, a ring member engaging said outer frusto-conical surface between its inner and outer boundaries, and metal means operatively associated with one of said members and engaging said ring member for urging said inner and annular surfaces into sealing contact with each other.

13. A fluid-tight joint comprising a member having an annular contact surface within a recess having a substantially cylindrical wall, a second member having a substantially cylindrical outer surface opposed to said cylindrical wall and having outer and inner frusto-conical surfaces, said annular surface being engageable with said inner surface between the inner and outer boundaries of the latter, said outer and inner frusto-conical surfaces each being generatable by rotation of its straight generatrix line about one end thereof positioned at approximately the same point on the center line of said second member, said members when assembled providing a space between said cylindrical surfaces small enough for said surfaces to engage with sealing contact under relative expansion without permanent deformation, and metal means connected to one of said members and engaging the other of said members for maintaining said members in position when said cylindrical surfaces are in sealing contact.

14. The combination and arrangement of elements specified in claim 1 in which the annular contact and inner surfaces seal on a esaling circle and in which said metal means engages said outer surface on a support circle having a diameter less than that of the sealing circle and greater than two-thirds of the diameter of the said sealing circle.

15. The combination and arrangement of elements specified in claim 1 in which the annular contact and inner surfaces seal on a sealing circle and in which the said point is in the plane of the sealing circle and in which the said metal means includes a ring surrounding one of the members and engaging said outer surface on a support circle having a diameter less than that of the sealing circle and greater than two-thirds of the diameter of the said sealing circle.

16. The combination and arrangement of elements set forth in claim 1 in which an annular seal ring is disposed between said annular contact and inner surfaces and in which said metal means urges said annular and inner surfaces into sealing contact with said seal ring.

17. The combination and arrangeemnt of elements set forth in claim 1 in which an annular seal ring is disposed between said annular contact and inner surfaces and in which said metal means includes a ring engaging said outer surface on a support circle having a diameter less than that of the seal ring and greater than two-thirds of the diameter of the seal ring and in which said ring urges said annular contact and inner surfaces into sealing contact with said ring.

18. The combination and arrangement of elements set forth in claim 1 in which the first said metal member is a pipe having a transverse flange provided with said annular contact surface and with an outer frusto-conical surface, in which said second metal member is a pipe having a transverse flange provided with said outer and inner frusto-conical surfaces, in which an annular seal ring is disposed between said annular and inner surfaces between the inner and outer boundaries thereof, and in which said metal means includes rings surrounding said pipes, urging said annular contact and inner surfaces into sealing contact with said seal ring and engaging said outer frusto-conical surfaces on a support circle having a diameter less than that of the seal ring but greater than two-thirds of the seal ring diameter.

19. The combination and arrangement of elements set forth in claim 1 in which the first said metal member is a transverse closure provided with said annular contact surface, in which said second metal member is a pipe having a transverse flange provided with said outer and inner frusto-conical surfaces, in which an annular seal ring is disposed between said annular and inner surfaces between the inner and outer boundaries thereof, and in which said metal means includes a ring surrounding said pipe and engaging said frusto-conical surface on a support circle having a diameter less than that of the seal ring but greater than two-thirds of the seal ring diameter.

20. The combination and arrangement of elements set forth in claim 1 in which one of said metal members is a pipe, and in which a heat flow retarding sleeve is disposed in said pipe adjacent to the other said member.

21. The combination and arrangement of elements set forth in claim 1 in which the said members are pipes and in which sleeves extend along the inner surfaces of the pipes from their adjacent ends and have recesses in their outer surfaces to receive heat insulating material between the sleeves and the inner surfaces of said pipes.

22. The combination and arrangement of elements set forth in claim 1 in which said metal means includes bolts having an equivalent elastic range beyond normal loading thereof and greater than the increase in thickness of said members between the effective points of engagement with said metal means.

23. The combination and arrangement of elements set forth in claim 1 in which said metail means includes rings engaging said members, bolts attached to one ring and extending through the other ring, nuts on the free ends of said bolts, and sleeve washers around said bolts between and engaging said nuts and ring.

References Cited in the file of this patent

UNITED STATES PATENTS

| Number | Name | Date |
|---|---|---|
| 342,659 | Westinghouse | May 25, 1886 |
| 734,677 | Dean | July 28, 1903 |
| 1,326,970 | Row et al. | Jan. 6, 1920 |
| 1,662,954 | Broido | Mar. 20, 1928 |
| 1,820,020 | Hewitt | Aug. 25, 1931 |
| 1,937,329 | Boyce | Nov. 28, 1933 |
| 2,105,022 | Wilson et al. | Jan. 11, 1938 |
| 2,247,125 | Hall | June 24, 1941 |
| 2,326,037 | Jung | Aug. 3, 1943 |
| 2,443,187 | Hobbs | June 15, 1948 |
| 2,582,889 | Sedgwick | Jan. 15, 1952 |

FOREIGN PATENTS

| Number | Country | Date |
|---|---|---|
| 800,516 | Germany | Nov. 13, 1950 |
| 410,473 | Germany | Mar. 9, 1925 |

OTHER REFERENCES

Alco Products Inc. Form 214, 1931.